United States Patent
Ilgevicius et al.

(10) Patent No.: US 12,504,484 B2
(45) Date of Patent: Dec. 23, 2025

(54) METHOD AND SYSTEM FOR MONITORING AT LEAST ONE INDUCTIVE OPERATING MEANS

(71) Applicant: Maschinenfabrik Reinhausen GmbH, Regensburg (DE)

(72) Inventors: Audrius Ilgevicius, Regensburg (DE); Michael Heger, Straubing (DE); Karsten Viereck, Regensburg (DE); Andreas Dreger, Kronberg im Taunus (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 576 days.

(21) Appl. No.: 17/629,422

(22) PCT Filed: Jun. 23, 2020

(86) PCT No.: PCT/EP2020/067394
§ 371 (c)(1),
(2) Date: Jan. 24, 2022

(87) PCT Pub. No.: WO2021/018478
PCT Pub. Date: Feb. 4, 2021

(65) Prior Publication Data
US 2022/0291296 A1 Sep. 15, 2022

(30) Foreign Application Priority Data
Jul. 26, 2019 (EP) .................................... 19188511

(51) Int. Cl.
*G01R 31/62* (2020.01)
(52) U.S. Cl.
CPC .................................. *G01R 31/62* (2020.01)

(58) Field of Classification Search
CPC ................................ G01R 31/62; G01R 31/50
See application file for complete search history.

(56) References Cited

U.S. PATENT DOCUMENTS

| | | | |
|---|---|---|---|
| 7,272,516 B2 | 9/2007 | Wang et al. | |
| 9,275,788 B2* | 3/2016 | Von Bloh | H02M 5/12 |

(Continued)

FOREIGN PATENT DOCUMENTS

| | | |
|---|---|---|
| CN | 103245857 A | 8/2013 |
| CN | 106934142 A | 7/2017 |

(Continued)

OTHER PUBLICATIONS

Lefeng Cheng et al., "Hot Spot Temperature and Grey Target Theory-Based Dynamic Modelling for Reliability Assessment of Transformer Oil-Paper Insulation Systems: A Practical Case Study," Energies, Jan. 2018, 26 pages, 249, vol. 11, No. 1, MDPI, Basel, Switzerland.

(Continued)

*Primary Examiner* — Reena Aurora
(74) *Attorney, Agent, or Firm* — LEYDIG, VOIT & MAYER, LTD.

(57) ABSTRACT

A method monitors at least one item of inductive equipment. The method includes: performing an operation of recording real-time data relating to a current condition of the at least one item of inductive equipment; performing an operation of transferring the recorded real-time data to a monitoring unit assigned to the at least one item of equipment; performing an operation of ascertaining a condition factor of the at least one item of inductive equipment based on the real-time data; performing an operation of ascertaining a failure rate for the at least one item of inductive equipment on the basis of the (Continued)

condition factor; and performing an operation of determining a maximum permitted hotspot temperature on the basis of the failure rate.

15 Claims, 5 Drawing Sheets

(56) References Cited

U.S. PATENT DOCUMENTS

| | | |
|---|---|---|
| 10,193,341 B2 * | 1/2019 | Abelen ................ G01R 19/06 |
| 10,613,066 B2 * | 4/2020 | Fenton ................ G01K 13/00 |
| 2019/0340708 A1 | 11/2019 | Viereck |

FOREIGN PATENT DOCUMENTS

| | | |
|---|---|---|
| CN | 107330286 A | 11/2017 |
| DE | 102017101413 A1 | 7/2018 |

OTHER PUBLICATIONS

He Jian et al, "Transformer real-time reliability model based on operating conditions," Journal of Zhejiang University Science A, Mar. 2007, pp. 378-383, vol. 8, No. 3, Zhejiang University Press, Hangzhou, China.

* cited by examiner

METHOD AND SYSTEM FOR MONITORING AT LEAST ONE INDUCTIVE OPERATING MEANS

CROSS REFERENCE TO RELATED APPLICATIONS

This application is a U.S. National Phase application under 35 U.S.C. § 371 of International Application No. PCT/EP2020/067394, filed on Jun. 23, 2020, and claims benefit to European Patent Application No. EP 19188511.0, filed on Jul. 26, 2019. The International Application was published in German on Feb. 4, 2021, as WO 2021/018478 A1 under PCT Article 21(2).

FIELD

The invention relates to a method for monitoring at least one item of inductive equipment. The item of equipment can be used in a power supply grid.

The invention also relates to a system for monitoring at least one item of inductive equipment in a power supply grid.

BACKGROUND

Power supply grids include a multiplicity of items of equipment, such as circuit breakers, isolating switches, grounding switches, coupler switches, voltage transformers, current transformers, power transformers, overhead lines, underground cables, and the like.

In order to ensure the interference-free supply of power, methods and systems that monitor the reliability of a power supply grid can be used. In this context, an important characteristic variable is the condition-dependent failure rate of the individual items of equipment.

U.S. Pat. No. 7,272,516 B2 discloses a method and system for analyzing the reliability of a power grid, the method and system ascertaining the failure rate of the individual components and subcomponents of a power grid and adjusting same for the current condition.

Moreover, standards and guidelines, for example IEEE or IEC standards, specify static overload limits for items of inductive equipment, for example transformers or inductors.

SUMMARY

In an embodiment, the present disclosure provides a method that monitors at least one item of inductive equipment. The method includes: performing an operation of recording real-time data relating to a current condition of the at least one item of inductive equipment; performing an operation of transferring the recorded real-time data to a monitoring unit assigned to the at least one item of equipment; performing an operation of ascertaining a condition factor of the at least one item of inductive equipment based on the real-time data; performing an operation of ascertaining a failure rate for the at least one item of inductive equipment on the basis of the condition factor; and performing an operation of determining a maximum permitted hotspot temperature on the basis of the failure rate.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
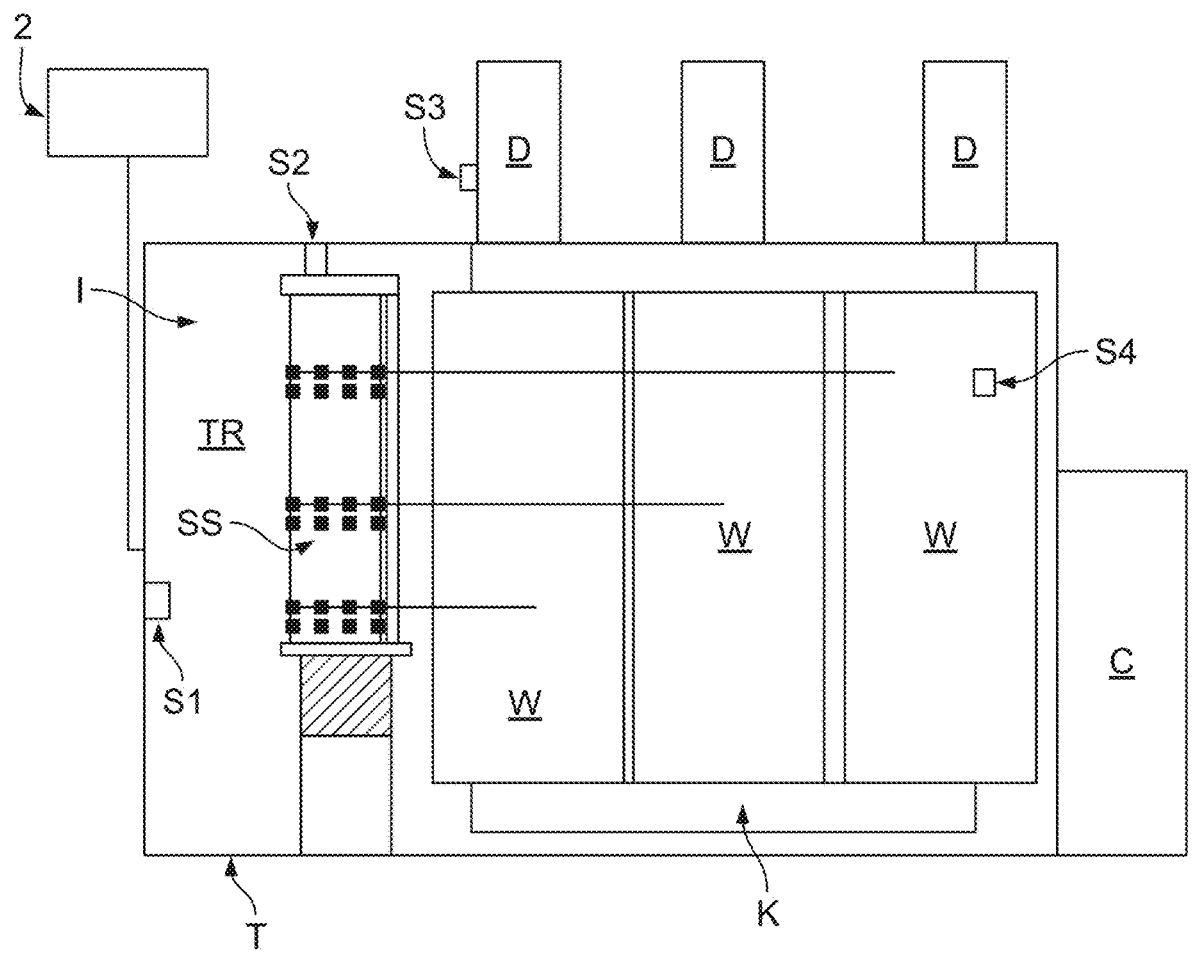
FIG. 1 shows a schematic design of an item of inductive equipment, which is a transformer, comprising an exemplary system according to the present disclosure.

Aspects of the present disclosure provide a method for monitoring at least one item of inductive equipment, which specifies an improved concept for using an item of inductive equipment in a power supply grid.

Aspects of the present disclosure also provide a system for monitoring at least one item of inductive equipment, which provides and enables an improved concept for using an item of inductive equipment in a power supply grid.

An improved concept, according to the present disclosure, is based on the idea of recording real-time data relating to the current condition of the item of inductive equipment, ascertaining a condition factor of the item of inductive equipment based on the real-time data, and ascertaining a failure rate for the item of inductive equipment on the basis of the condition factor. A maximum permitted hotspot temperature of the item of inductive equipment is then specified on the basis of the failure rate.

The hotspot temperature is considered, in many applications, to be the most important characteristic variable for the load margin and therefore also the service life of the item of inductive equipment. The hotspot temperature is the highest temperature in a winding and is to be expected in the interior of the winding. Direct measurement of the temperature in the interior of a winding is possible, but expensive and complicated. Therefore, the indirect measurement method based on measuring the oil temperature and the current has proven expedient.

A method for using an item of inductive equipment in a power supply grid is specified according to the improved concept. In this case, real-time data relating to the current condition of the item of inductive equipment are recorded, a condition factor of the item of inductive equipment is ascertained based on the recorded real-time data, and a failure rate for the item of inductive equipment is ascertained on the basis of the condition factor. A maximum permitted hotspot temperature of the item of inductive equipment is then ascertained on the basis of the failure rate.

An advantage of methods and of systems according to aspects of the present disclosure is that the maximum permitted hotspot temperature, which is ascertained in order to ascertain the utilization limit of the item of inductive equipment, takes into account the current condition of the item of inductive equipment as well as statistical and historical information.

A method according to the preset disclosure is used to ascertain a maximum permitted hotspot temperature of the item of inductive equipment, which is adjusted for the current condition of the item of equipment. In this way, the utilization limit of the item of inductive equipment can be increased or better utilized, if the item of inductive equipment is able to take additional loading, or reduced, if the item of inductive equipment is in a condition in which it cannot take any additional loading without the operational safety being compromised. Moreover, the utilization limit can be determined more accurately as a result of the use of current measurement data in the ascertainment.

Real-time data relating to the current condition of the item of inductive equipment are data based on the current operating conditions of the item of inductive equipment or components thereof. In particular, real-time data are measured values that are recorded while the item of inductive equipment is in operation, for example the temperature of the insulating means, the load current, the operating voltage, the tap changer position, and the winding temperature. According to at least one embodiment, the item of inductive equipment is in the form of a transformer or an inductor.

According to at least one embodiment, the failure rate is in the form of a normalized value.

According to at least one embodiment, the method is applicable both for short-term overloads, meaning that an item of inductive equipment takes up the load of another item of inductive equipment experiencing a brief failure, for example on account of maintenance work, and for long-term overloads, as can occur, for example, during normal operation and in the case of cyclic load distribution operations.

The term "overload" is defined hereinafter as a load which is above the power rating of the item of inductive equipment defined by the manufacturer of the item of inductive equipment.

According to at least one embodiment, the overload capacity of the item of inductive equipment is ascertained on the basis of the maximum permitted hotspot temperature.

According to at least one embodiment, the overload capacity is ascertained using a thermal model in accordance with IEC or IEEE standards, in particular the standards IEC 60076-7 or IEEE C57.91.

According to at least one embodiment, the real-time data are recorded by means of a sensor or a plurality of sensors, for example by means of temperature sensors, moisture sensors, DGA sensors, partial discharge sensors, measuring devices for ascertaining the bushing capacitance or sensors for ascertaining the frequency of the cooling system fans.

According to at least one embodiment, the real-time data are ascertained by means of instrument transformers for current and/or voltage, online DGA analyses or other tests performed on the item of inductive equipment while the latter is connected to the power supply grid.

According to at least one embodiment, ascertaining the failure rate comprises recording an offline failure rate based on historical data relating to the item of equipment, recording a statistical failure rate based on statistical data relating to the item of inductive equipment and/or a plurality of items of inductive equipment, and ascertaining an online failure rate based on the recorded real-time data relating to the current condition of the item of inductive equipment.

According to at least one embodiment, the failure rates are weighted on the basis of the significance and/or availability and/or quality of the respective data, wherein the failure rate FR is ascertained from the weighted failure rates.

According to at least one embodiment, historical data relating to the item of inductive equipment comprise data based on maintenance operations and/or inspections and/or tests on the item of inductive equipment or components thereof that have been performed in the past, and/or data relating to the item of equipment or components thereof that were ascertained during commissioning. In particular, historical data are measured values based on analyses and/or measurements performed on the item of inductive equipment or components thereof while the item of inductive equipment was not connected to the power supply grid. In particular, the historical data comprise information ascertained by offline condition assessment systems, for example technical data relating to the age, manufacturer and model of the item of inductive equipment, load profiles, results of offline DGA analyses or other oil analyses, in particular oil quality parameters, information based on assessments of the bushings by thermography and/or electrical measurements, information based on assessments of the vessel and the accessories by visual inspections, and information based on dynamic resistance measurements or FRA (frequency response analysis).

According to at least one embodiment, statistical data relating to the item of inductive equipment comprise data relating to the service life of the item of equipment or components thereof and/or data dependent on the age of the item of inductive equipment or of the components. In particular, the statistical data are operator-specific data relating to the item of equipment or components thereof, which data are recorded and stored by the operator of the item of equipment and/or data from statistical surveys such as the survey "Cigre A2.37 TB642-Transformer Reliability Survey".

According to at least one embodiment, the online failure rate is ascertained based on the recorded real-time data relating to the current condition of the item of inductive equipment during ongoing operation of the item of inductive equipment.

According to at least one embodiment, ascertaining the failure rate furthermore comprises determining relevant components of the item of inductive equipment that are decisive for determining the failure rate, recording real-time data relating to the current condition of the relevant components of the item of inductive equipment, ascertaining a condition factor for each relevant component based on the recorded data, ascertaining a fault rate for each relevant component based on the ascertained condition factor, wherein the overall failure rate for the item of inductive equipment is ascertained from the fault rates of the relevant components.

Relevant components can in particular be components whose failure can result in failure of the item of inductive equipment or have an impact on the failure rate of the item of inductive equipment, for example a tap changer or a bushing.

According to at least one embodiment, relevant components of the item of inductive equipment are on-load tap changers and/or insulating means and/or solid insulating materials and/or cooling systems and/or bushings and/or windings and/or cores.

According to at least one embodiment, the method furthermore comprises ascertaining forecast data relating to the future condition of the item of inductive equipment, ascertaining a forecast overload capacity based on the forecast data, and assessing the ascertained overload capacity on the basis of the deviation from the forecast overload capacity. Recording the forecast data can in this case in particular comprise acquiring forecast data from a superordinate communication system, for example the control system and/or weather services, or ascertaining forecast data based on measurements on the item of equipment.

According to at least one embodiment, the forecast overload capacity is ascertained by ascertaining a forecast condition factor of the item of inductive equipment based on the forecast data, ascertaining a forecast failure rate for the item of inductive equipment on the basis of the forecast condition factor, and determining a forecast maximum permitted hotspot temperature on the basis of the forecast failure rate.

According to at least one embodiment, the forecast overload capacity is ascertained on the basis of the forecast maximum permitted hotspot temperature. In particular, the forecast overload capacity takes into account the service life of the item of equipment and/or of the components thereof and/or is dependent on the age of the item of inductive equipment and/or of the components thereof.

According to at least one embodiment, the forecast data are based on the usage plan for the item of inductive equipment in the power supply grid, in particular the operator-specific usage plan, and in particular on the load profile of the item of inductive equipment and/or the ambient conditions, for example the ambient temperature, the wind speed, the wind direction and/or the solar irradiation and/or on reliability analyses deriving from the load profiles taking into account what is known as the N-x criterion. This criterion states that the operation or functionality of the overall system has to be reliably ensured in the event that a number x of items of equipment of the system fail.

According to at least one embodiment, the item of inductive equipment is in the form of a transformer.

An aspect of the present disclosure provides system for using an item of inductive equipment in a power supply grid. The system may include a monitoring unit, which has a data memory, which comprises real-time data relating to the current condition of the item of inductive equipment. The monitoring unit furthermore has an evaluation device, which is set up to obtain real-time data relating to the current condition of the item of inductive equipment from the data memory, ascertain a condition factor of the item of inductive equipment based on the real-time data, ascertain a failure rate for the item of inductive equipment on the basis of the condition factor, and determine a maximum permitted hotspot temperature on the basis of the failure rate.

According to at least one embodiment, the power supply grid comprises a plurality of items of inductive equipment that each comprise a system for using the respective item of inductive equipment according to the improved concept. In particular, the plurality of items of equipment are of the same design and constitute, for example, a transformer fleet comprising transformers of the same power class.

According to at least one embodiment, the evaluation device is furthermore set up to ascertain the overload capacity of the item of inductive equipment on the basis of the maximum permitted hotspot temperature.

According to at least one embodiment, the system comprises a display unit, which is set up to indicate the ascertained overload capacity of the item of inductive equipment. Advantageously, the ascertained overload capacity is indicated as a specific value.

According to at least one embodiment, the system comprises a communication unit, which is set up to transmit the overload capacity ascertained by the monitoring unit to the display unit.

According to at least one embodiment, the communication unit is furthermore set up to transmit forecast data to the display unit and/or to the monitoring unit. Advantageously, the data are transmitted in the form of control system protocols.

According to at least one embodiment, the system comprises at least one condition assessment system, which is connected to the item of inductive equipment and is set up to record historical data relating to the item of inductive equipment, to ascertain an offline failure rate based on the historical data relating to the item of inductive equipment, and to transmit the offline failure rate to the monitoring unit.

According to at least one embodiment, the offline failure rate is ascertained based on Bayes' law.

According to at least one embodiment, the system comprises at least one reliability database, which is connected to the item of inductive equipment and is set up to record statistical data relating to the item of inductive equipment, to ascertain a statistical failure rate based on statistical data relating to the item of inductive equipment, and to transmit the statistical failure rate to the monitoring unit.

According to at least one embodiment, the monitoring unit of the system is furthermore set up to obtain forecast data relating to the future condition of the item of inductive equipment, to ascertain a forecast overload capacity based on the forecast data, and to assess the ascertained overload capacity on the basis of the deviation from the forecast overload capacity. In particular, the forecast data are transmitted by the communication unit, in the form of communication protocols, for example in accordance with the standards IEC 60570-5-104 or IEC 61850, to the evaluation unit, which ascertains a forecast overload capacity for the item of inductive equipment.

An aspect of the present disclosure provides an item of inductive equipment, for example, a transformer or an inductor comprising a system for using the item of inductive equipment according to the improved concept.

Further embodiments and implementations of the system and of the item of inductive equipment and of the power supply system emerge directly from the various embodiments of the method.

The term "power supply grid" is defined herein as a system for transmitting and/or distributing electrical energy. For example, the system may be an entire energy transmission and distribution system, a substation, a multiplicity of substations, a section of a transmission line, a section of a supply line or the like.

The term "failure rate" is defined herein as the number of instances of failure of an item of equipment per unit time. The term "failure" is defined herein as a cessation of the capability of the item of inductive equipment to perform a required function.

The present disclosure is explained in detail below on the basis of exemplary embodiments with reference to the drawings. Components which are identical or functionally identical or have an identical effect may be provided with identical reference signs. In some cases, identical components or components with an identical function are explained only in relation to the figure in which they appear for the first time. The explanation is not necessarily repeated for the subsequent figures.

FIG. 1 shows an item of inductive equipment TR, which is, by way of example, in the form of a transformer TR, in particular a power transformer, here. Even though the description below relates to a transformer TR or power transformer, this should not be interpreted as limiting the invention. The item of inductive equipment TR is equipped with a system according to an embodiment of the invention for monitoring at least one item of inductive equipment TR.

The transformer TR, which is the item of inductive equipment TR in this embodiment, comprises a tank or vessel T, which is filled, for example, with an insulating means I, in particular an insulating liquid such as transformer oil. The active part of the transformer TR, in particular the transformer core K with the associated transformer windings W, is arranged inside the tank or vessel T. The transformer TR has many other components, for example at least one bushing D and at least one cooler C. In addition, a tap changer SS for changing over between different winding taps of the transformer TR, for example, is located inside the tank or vessel T.

The transformer TR and the components may be equipped with a plurality of sensors S1, S2, SN of a wide variety of types for measuring real-time data (for example, a temperature sensor S1 for measuring the oil temperature in the tank T may be provided). Depending on the type of sensor S1, S2, SN or on the type of data to be recorded, the sensors S1, S2, SN are arranged either inside the tank T (for example the winding temperature sensor S4 for measuring a temperature of the windings W or the temperature sensor S1 for measuring the oil temperature in the tank T) or outside the tank (for example an operating voltage sensor for measuring an operating voltage or an ambient temperature sensor for measuring the ambient temperature). The measured real-time data are read by a monitoring unit 2. The monitoring unit may be connected to the sensors S1, S2, SN in a wired or wireless fashion. The monitoring unit 2 may be arranged on the transformer TR or at a distance from the transformer TR.

Figure 2:
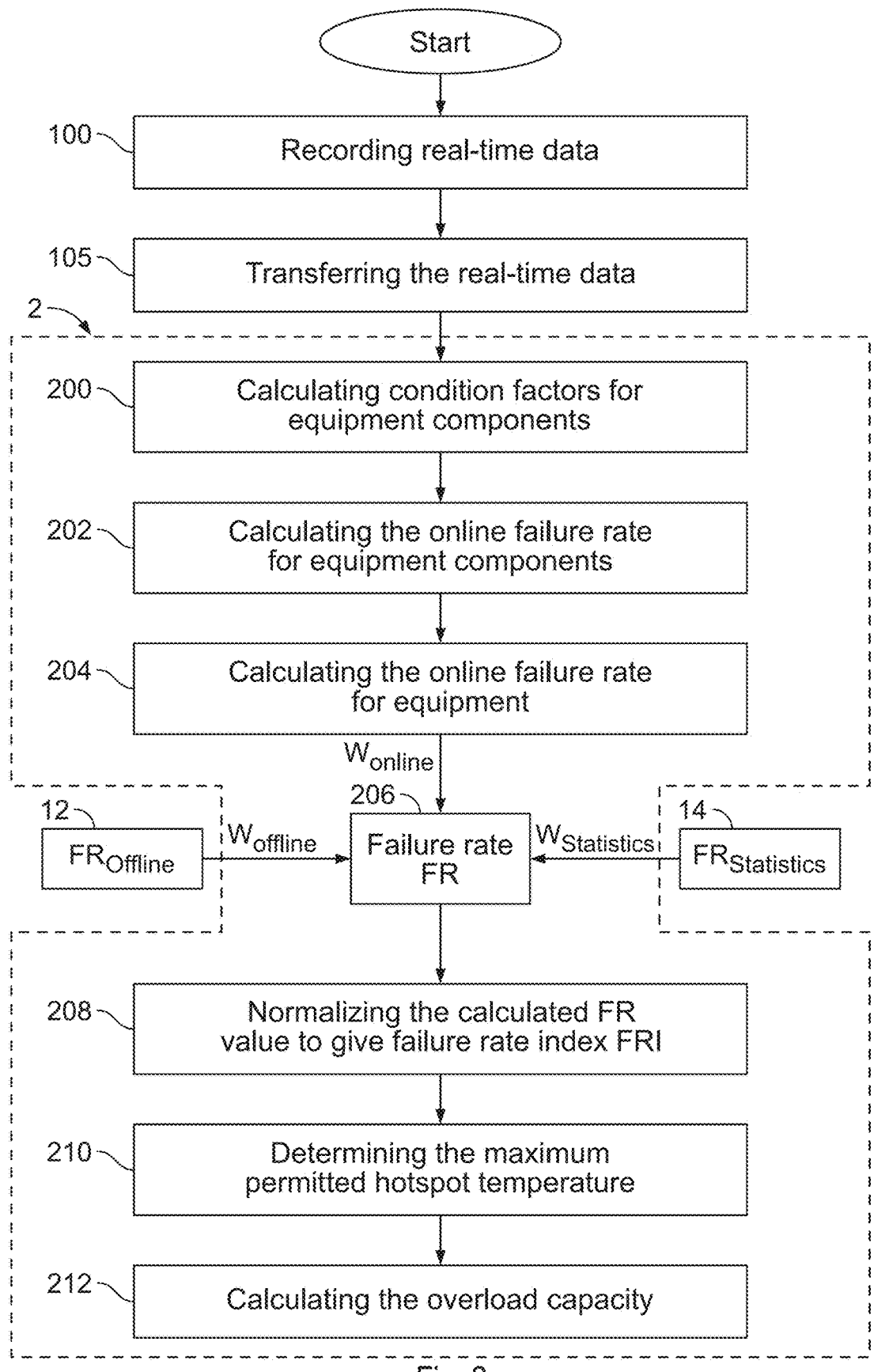
FIG. 2 shows an exemplary method sequence according to the present disclosure.

FIG. 2 shows an exemplary method sequence of the method for monitoring at least one item of inductive equipment TR. In a first step 100, the real-time data 22 are recorded by the sensors S1, S2, SN during operation of the transformer TR. In a next step 105, the real-time data 22 are read into the monitoring unit 2. The data are, for example, the temperature of the insulating means, the load current, the operating voltage, the tap changer position, the winding temperature or measured values from an online DGA analysis relating to the composition of the insulating oil in the transformer TR or in the tap changer SS, the oil moisture content or the oil temperature.

In a next step 200, the condition factor $CF_1, CF_2, \ldots, CF_M$ for relevant components $K_1, K_2, \ldots, K_M$ of the transformer TR is ascertained by means of the function $$CF_i = \max(CP_i)$$

in the monitoring unit 2. Relevant components $K_1, K_2, \ldots, K_M$ are, for example, the insulating oil I, the windings W, the bushings D, the tap changer SS or the cooling system C and can be determined by the transformer operator. $CP_1, CP_2, \ldots, CP_N$ are the measured values recorded by the sensors $S1, S2, \ldots, SN$ (real-time data 22).

In a next step 202, the online failure rate for each component $K_1, K_2, \ldots, K_M$ of the transformer TR is calculated using the formula $$FR_{c,i} = f(CF_i)$$

in the monitoring unit 2. The function f(CF) can in this case be defined as any distribution function, for example a Weibull distribution or a normal distribution.

In a next step 204, the online failure rate $FR_{Online}$ for the entire transformer TR, which is composed of the previously calculated online failure rates of the individual components $K_1, K_2, \ldots, K_M$, is ascertained:

$$FR_{Online} = \sum_{i=1}^{N} FR_{c,i}$$

In a next step 206, the overall failure rate FR is ascertained:

$$FR = w1*FR_{Online} + w2*FR_{Offline} + w3*FR_{Statistics}$$

The overall failure rate is composed of the online failure rate $FR_{Online}$ ascertained using the real-time data 22 and of the historical failure rate $FR_{Offline}$ and the statistical failure rate $FR_{Statistics}$. $FR_{Offline}$ is ascertained using historical data and calculated by a condition assessment system 12 for transformers TR, for example according to Bayes' law. The known condition assessment systems 12 are used to specify, on the basis of offline data such as technical data, historical data, data from oil tests and factory tests or other data recorded while the item of inductive equipment was not connected to the power supply grid, the maintenance urgency and/or the service life consumption of a transformer TR and/or of individual transformer components and/or of a transformer fleet. The statistical failure rate $FR_{Statistics}$ is ascertained using statistical data from a reliability database 14. The reliability database 14 contains various statistical data relating to the risk of failure of transformers TR and/or individual transformer components and/or a transformer fleet. For example, the reliability database 14 may be maintained by the operator of the item of equipment and contain operator-specific data. The data may, for example, be stored in the form of survival functions and/or service life distribution functions and/or hazard functions. For example, statistical fault rates from statistical surveys such as Cigre A2.37 TB642—Transformer Reliability Survey may be used to ascertain the failure rate FR.

The failure rate $FR_{Online}$, the historical failure rate $FR_{Offline}$ and the statistical failure rate $FR_{Statistics}$ are furthermore weighted according to the significance and/or availability and/or quality of the respective data. For example, the weighting for the failure rate $FR_{Online}$ is w1=50%, the weighting for the statistical failure rate $FR_{Statistics}$ is w2=40%, and the weighting for the historical failure rate $FR_{Offline}$ is w3=10%.

In a next step 208, a failure rate index FRI is ascertained from the failure rate (FR):

$$FRI = 1 - e^{-FR*t}$$

where t is the number of years of operation of the transformer TR.

Thus, the failure rate index FRI specifies a normalized value, for example between 0 and 1, for the fault probability for the transformer TR, which is indexed to the condition of the transformer TR and the transformer components $K_1, K_2, \ldots, K_M$.

In a next step 210, the maximum permitted hotspot temperature $T_{HST\_FRI}$ is adjusted for the current condition of the transformer TR using the failure rate index FRI. The following formula is used for this purpose:

$$T_{HST\_FRI} = T_{HST\_max} - (T_{HST\_max} - T_{HST\_min})*FRI$$

Figure 3:
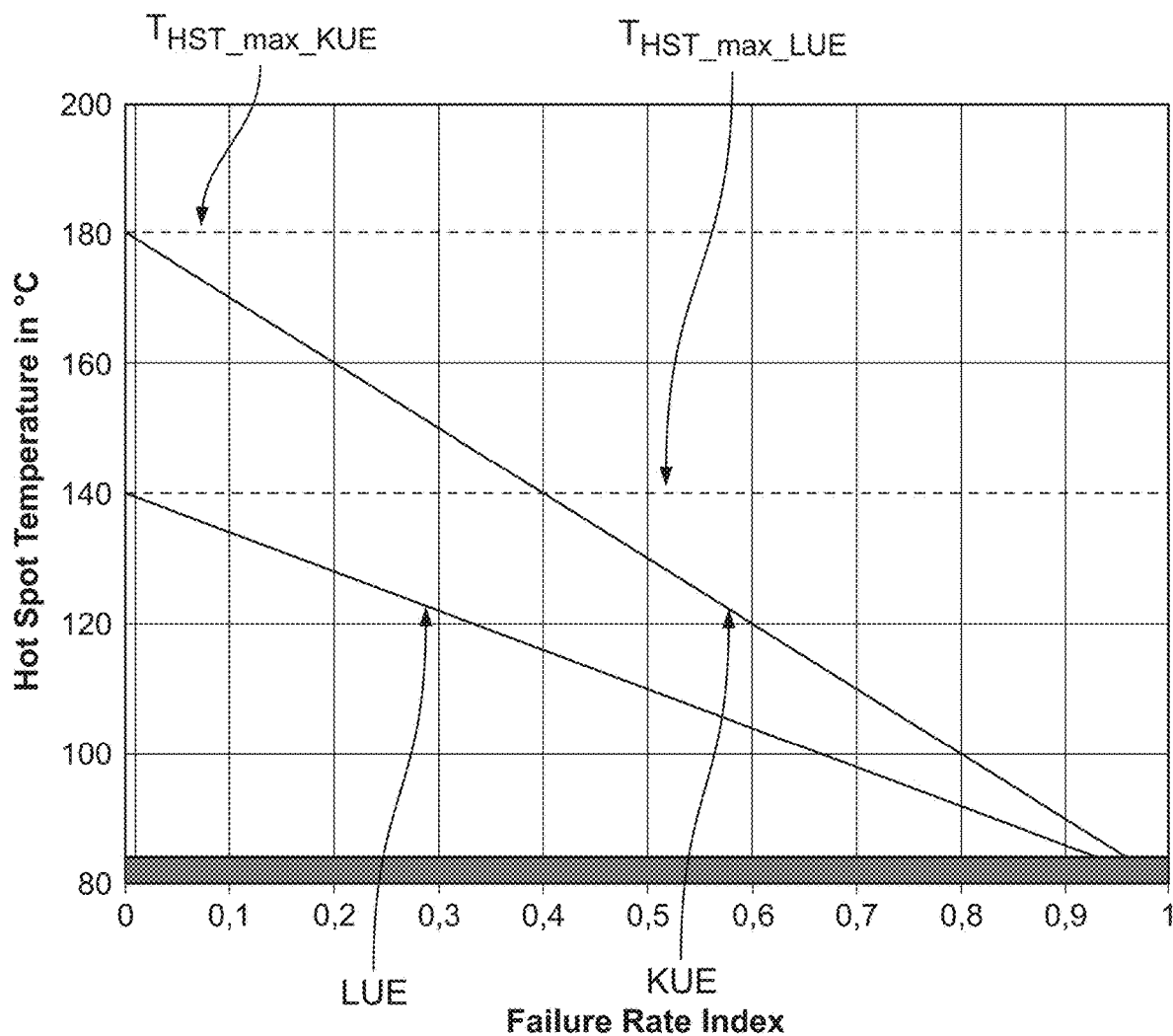
FIG. 3 shows a graphical exemplary representation according to the present disclosure.

The value for the maximum hotspot temperature $T_{HST\_max}$ is set in accordance with the prescribed maximum values for overload on transformers according to IEC or IEEE standards, in particular the standards IEC 60076-7 and IEEE C57.91. The overload capacity is ascertained in the final step 212. For example, $T_{HST\_max}=180°$ C. applies for short-term overload and $T_{HST\_max}=140°$ C. for long-term overload. The minimum hotspot temperature $T_{HST\_min}$, in contrast, has to be established in an operator-specific manner, for example based on empirical values of a transformer operator or grid operator. The value may vary depending on the respective transformer TR or operator. For example, the minimum hotspot temperature $T_{HST\_min}$ may be between 60 and 100° C. and, in particular, 98° C. FIG. 3 shows an exemplary graphical representation, which indicates the maximum permitted hotspot temperature as a function of the failure rate index FRI for short-term overload KUE and long-term overload LUE. By way of example, a value of 80° C. has been established for $T_{HST\_min}$, and likewise, by way of example, $T_{HST\_max\_KUE}$=180° C. applies for short-term overload and $T_{HST\_max\_LUE}$=140° C. for long-term overload.

For example, a forty-year-old transformer has elevated measured values for oil moisture content. In addition, online DGA analysis indicates an elevated rate of increase of the DGA values. Based on these measured real-time data 22, the method according to an embodiment of the invention is used to ascertain a normalized failure probability of 0.9, taking into account the statistical failure rate $FR_{Statistics}$ and the historical failure rate $FR_{Offline}$. According to FIG. 3, this results in a maximum permitted hotspot temperature $T_{HST\_FR}$ of 87° C. for long-term overload and a maximum permitted hotspot temperature $T_{HST\_FR}$ of 91° C. for short-term overload. Based on the ascertained maximum permitted hotspot temperature $T_{HST\_FR}$, overload operation of this transformer is not permissible due to the poor oil moisture content values and the elevated gas content in the transformer oil.

In a further method step, the overload factor $K_{overload}$ can be ascertained, taking into account the failure rate index FRI and the ascertained maximum permitted hotspot temperature $T_{HST\_FRI}$, in accordance with the thermal model according to IEC 60076-7 or IEEE C57.91:

$$K_{overload} = f(T_{HST\_FRI}, T_{oil}, t_{overload}, L_{Aging})$$

where $T_{oil}$ corresponds to the measured and/or calculated oil temperature in the transformer tank, $t_{overload}$ corresponds to the period of time until the maximum hotspot temperature $T_{HST\_max}$, according to the IEC or IEEE standards and/or a maximum oil temperature prescribed according to the IEC or IEEE standards is reached, and $L_{Aging}$ corresponds to the service life consumption of the solid insulation.

This makes it possible to make a statement about the overload capacity of a transformer TR which is adapted to the current condition of the transformer, i.e. if necessary, the utilization limit and in particular the period of time for which the transformer TR can withstand an overload can be stretched as far as possible. Conversely, for example, it is possible for the load on a transformer TR which is in a relatively poor condition to be relieved, or for the transformer not to be subjected to any additional load.

Furthermore, the method can be extended to the effect that forecast data 24, such as load profiles and weather data, are additionally recorded, the forecast data being used to calculate a forecast overload factor, for example also in accordance with the thermal model according to IEC 60076-7 or IEEE C57.91, and the ascertained overload factor $K_{overload}$ is assessed on the basis of the deviation from the forecast overload capacity.

Figure 4:
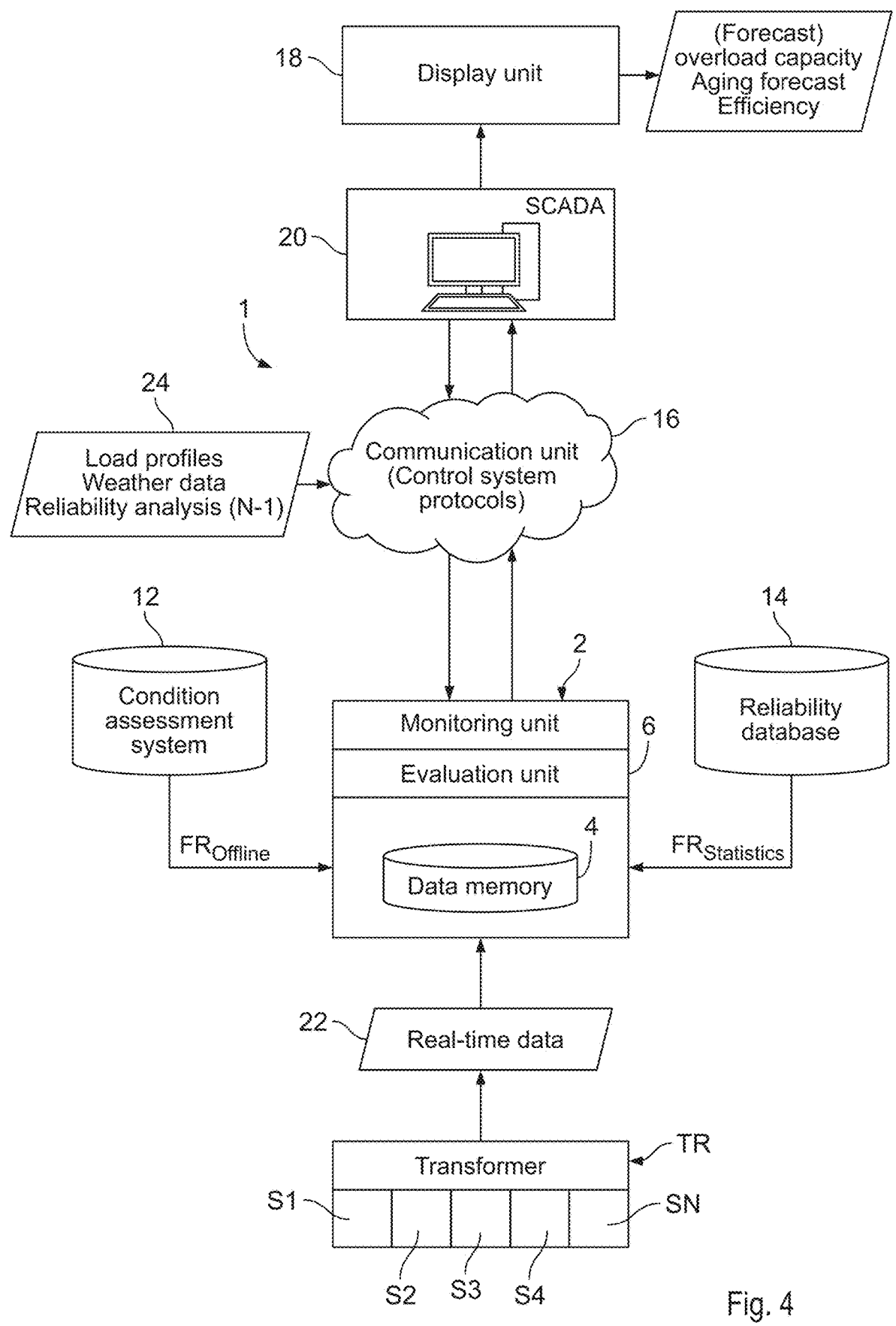
FIG. 4 shows a schematic exemplary design of a system according to the present disclosure.

FIG. 4 shows a schematic exemplary design of a system according to the improved concept. The system comprises a monitoring unit 2 comprising a data memory 4 and an evaluation unit 6. Real-time data 22 are recorded by means of sensors S1, S2, . . . , SN, which are mounted on the item of equipment TR, which is a transformer TR in this exemplary embodiment, and on the components of the transformer TR, for example in the insulating means I (insulating oil), on the tap changer SS or on the bushings D, and are stored in the data memory 4.

The evaluation unit 4 obtains the real-time data from the data memory 4 and executes the algorithm for calculating the failure rate FR, ascertains the maximum permitted hotspot temperature $T_{HST\_FRI}$ based on the failure rate, and executes the algorithm for calculating the overload capacity $K_{overload}$.

The system furthermore comprises a condition assessment system 12. The condition assessment system 12 comprises historical data which were, in particular, recorded when the transformer was offline, that is to say not connected to the power grid. These offline data are, for example, technical data, historical data or data from oil tests or factory tests. The condition assessment system 12 can use these data, for example, to ascertain the maintenance urgency and/or the service life consumption of a transformer and/or of individual transformer components and/or of an entire transformer fleet. Furthermore, the condition assessment system 12 uses the historical data to calculate a historical fault rate $FR_{Offline}$ for the respective transformer, preferably according to Bayes' law, the historical failure rate being transmitted to the data memory 4 and included in the calculation of the overall failure rate FR. Typical values for the offline fault rate of transformers without any abnormalities are, for example, 1 to 2.5% per year. Depending on the age and condition of the transformer and of the transformer components, the offline failure rate can increase from 25 to 50%. The operator of the power supply grid can use the ascertained offline fault rate for the respective transformer, for example, to draw conclusions about the risk of failure of the entire transformer fleet and the power supply grid and, based on this, to make decisions about measures to be taken, for example repairing or replacing items of equipment.

The system furthermore comprises a reliability database 14. This database contains various statistical data relating to the risk of failure of transformers, transformer components and transformer fleets. The data may, for example, be stored in the form of survival functions, service life distribution functions or hazard functions. For example, statistical fault rates from statistical surveys such as the Cigre A2.37 TB642—Transformer Reliability Survey may also be stored in the reliability database and used to ascertain a statistical failure rate $FR_{Statistics}$. The statistical failure rate $FR_{Statistics}$ is transmitted to the data memory 4 and is also included in the calculation of the overall failure rate FR.

The inclusion of the statistical and historical data or failure rates as well as the real-time data 22 in the calculation of the overall failure rate FR makes it possible to increase the accuracy of the calculated overload capacity $K_{overload}$ and the significance thereof with respect to the respective transformer TR since, for example, not all the data relevant to the calculation of the failure rate FR are able to be recorded by the sensors S1, S2, SN.

The system furthermore comprises a communication unit 16, which is set up to transmit the overload capacity $K_{overload}$ ascertained by the monitoring unit 2 to a display unit 18. The display unit 18 may, for example, be the screen of a central server PC, which is equipped with any desired software for grid management, for example a control system 20 (SCADA control system).

Forecast data 24, for example in the form of load profiles and weather data and also data from reliability analyses, are furthermore transmitted by means of the communication unit 16, via communication protocols, for example in accordance with the standards IEC 60570-5-104 or IEC 61850, to the display unit 18 and the monitoring unit 2. For example, the forecast data 24 include the expected power feed from wind turbines or photovoltaic systems or data relating to the reliability of a transformer TR in the event of overload and the associated costs of failure and risks.

As well as the information ascertained by the evaluation unit 6, additional information, for example relating to the aging process in the transformer or the efficiency of the transformer, can be presented in numerical, tabular or graphical form by means of the display unit 18.

Figure 5:
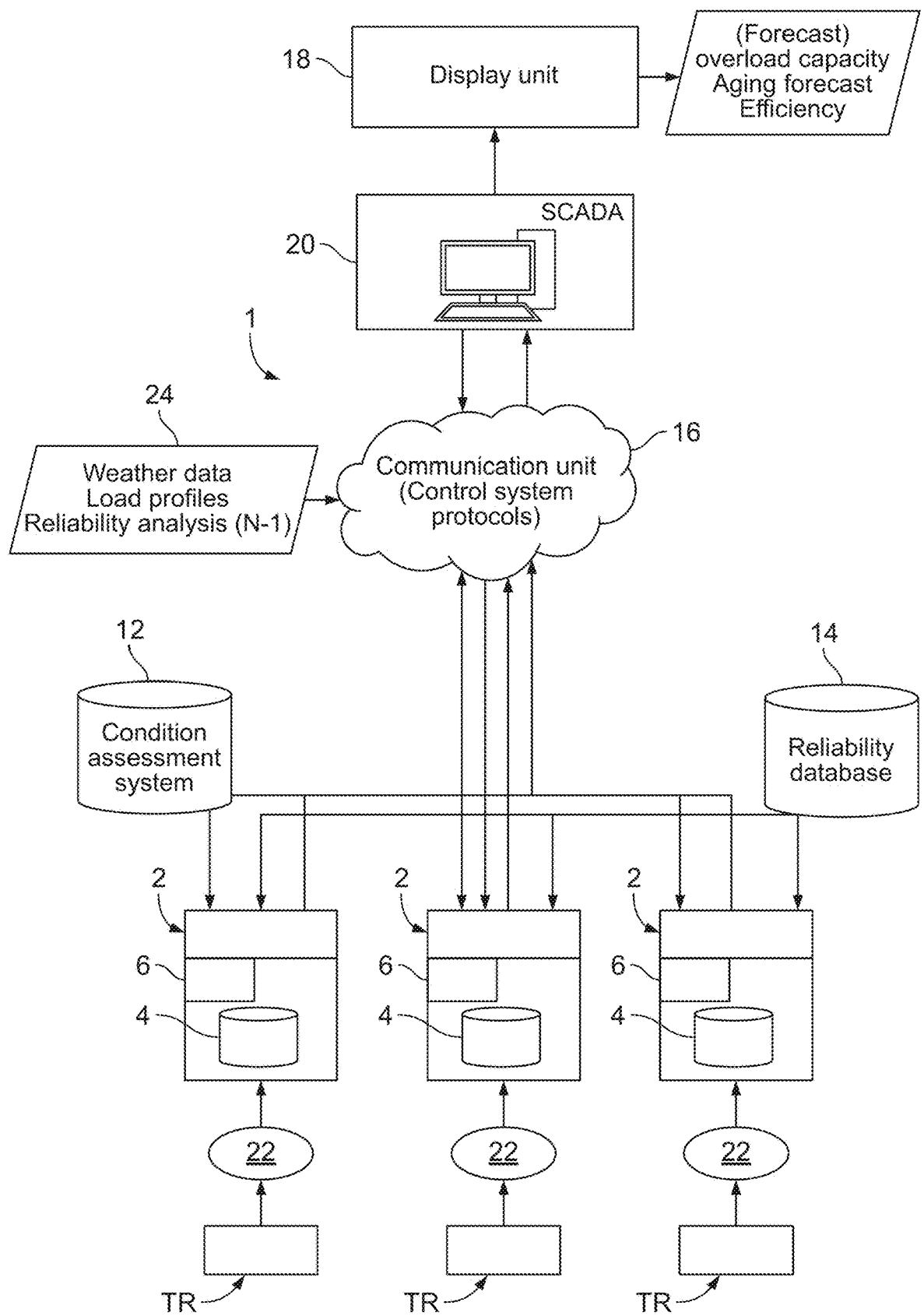
FIG. 5 shows a further schematic exemplary design of a system according to the present disclosure.

FIG. 5 shows a further exemplary design of a system 1 according to the improved concept, wherein the system 1 here comprises a transformer fleet (a plurality of items of equipment TR). Each transformer of the transformer fleet comprises a monitoring unit 2. The condition assessment system 12 and the reliability database 14 transmit the respective data to the data memories 4 of the respective monitoring units 2 of the transformers that are part of the fleet. In return, the monitoring units 2 transmit the overload capacity ascertained for the respective transformer to the communication unit 16. In this case, the online failure rate $FR_{Online}$ is based on real-time data relating to the entire transformer fleet, i.e. real-time data for a plurality of transformers TR are included in the calculation of the fault rate FR.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 System
2 Monitoring unit
4 Data memory
6 Evaluation unit (evaluator)
8 Display unit
10 Communication unit
12 Condition assessment system
14 Reliability database
16 Communication unit
18 Display unit
20 Control system
22 Real-time data
24 Forecast data
100 First step
105 Transfer
200 Next step
202 Next step
204 Next step
206 Next step
208 Step
210 Step
212 Final step
C Cooler
CF Condition factor
CP Real-time data
D Bushings
FR Failure rate
$FR_{online}$ Failure rate from real-time data
$FR_{Offline}$ Historical failure rate
$FR_{Statistics}$ Statistical failure rate
I Insulating means
K Core
$K_1, K_2, \ldots, K_M$ Component of the item of equipment
KUE Short-term overload
LUE Long-term overload
S1, S2, . . . , SN Sensor
SS Tap changer
T Tank
TR Item of inductive equipment; transformer
W Windings

The invention claimed is:

1. A method for operating at least one item of inductive equipment in a power supply grid, the method comprising:
recording real-time data relating to a current condition of the at least one item of inductive equipment over a period of time, the real-time data relating to the current condition of the at least one item of inductive equipment comprising a temperature of an insulator, a load current, an operating voltage, a tap changer position, measured values from an online dissolved gas analysis (DGA) analysis relating to a composition of an insulating oil, oil moisture content, oil temperature, or a winding temperature;
transferring the recorded real-time data to a monitoring unit assigned to the at least one item of equipment, the monitoring unit comprising a data memory and an evaluator, the data memory being configured to store real-time data relating to a current condition of the item of inductive equipment in operation;
ascertaining a condition factor of at least one component of the at least one item of inductive equipment as a maximum value of one of the real-time data associated with the at least one component, the at least one component comprising insulating oil, windings. bushings, tap changer, or a cooling system;
ascertaining a failure rate for the at least one item of inductive equipment on the basis of the condition factor by calculating a distribution function using the condition factor; and
determining a maximum permitted hotspot temperature on the basis of the failure rate of the at least one item of inductive equipment based a failure rate index determined from the failure rate and a total operating time of the item of inductive equipment; wherein ascertaining the failure rate comprises: recording a historical failure rate, which is based on historical data relating to the item of inductive equipment; recording a statistical failure rate, which is based on statistical data relating to the item of inductive equipment; ascertaining an online failure rate based on the recorded real-time data relating to the current condition of the item of inductive equipment; and weighting the historical failure rate, the statistical failure rate and the online failure rate from the real-time data on the basis of a significance, an availability, or a quality of the respective data, wherein the failure rate is ascertained from the weighted historical failure rate, the weighted statistical failure rate, and the weighted online failure rate from the real-time data, and wherein the claim further comprises operating the at least one item of inductive equipment based on the maximum permitted hot spot temperature.

2. The method as claimed in claim 1, wherein an overload capacity of the at least one item of inductive equipment is ascertained on the basis of the maximum permitted hotspot temperature.

3. The method as claimed in claim 1, wherein the real-time data of the at least one item of inductive equipment are recorded using one or more sensors.

4. The method as claimed in claim 1, wherein ascertaining the failure rate comprises:
   determining relevant components of the item of inductive equipment that are decisive for determining the failure rate;
   recording real-time data relating to the current condition of the relevant components of the item of inductive equipment;
   ascertaining a condition factor for each relevant component based on the recorded data; and
   ascertaining a fault rate for each relevant component based on the ascertained condition factor, and
   wherein the failure rate for the item of inductive equipment is ascertained from the fault rate of each of the relevant components.

5. The method as claimed in claim 1, the method comprising:
   ascertaining forecast data relating to a future condition of the item of inductive equipment; and
   ascertaining a forecast overload capacity based on the forecast data,
   wherein the ascertained overload capacity is assessed on the basis of a deviation from the forecast overload capacity.

6. The method as claimed in claim 5, wherein the forecast data are based on a usage plan for the at least one item of inductive equipment and on the ambient conditions.

7. The method as claimed in claim 1, wherein the item of inductive equipment comprises a transformer.

8. The method as claimed in claim 1, wherein a plurality of items of inductive equipment are connected to one another in a grid, and the items of inductive equipment are monitored.

9. A system for monitoring at least one item of inductive equipment in a power supply grid, the system comprising:
   a monitoring unit assigned to each of the at least one item of inductive equipment, the monitoring unit comprising a data memory and an evaluator, the data memory being configured to store real-time data relating to a current condition of the item of inductive equipment in operation, and the evaluator being communicatively connected to the data memory and being configured to:
   obtain real-time data relating to the current condition of the at least one item of inductive equipment from the data memory over a period of time, the real-time data relating to the current condition of the item of inductive equipment comprising a temperature of an insulator, a load current, an operating voltage, a tap changer position, measured values from an online dissolved gas analysis (DGA) analysis relating to a composition of an insulating oil, oil moisture content, oil temperature, or a winding temperature;
   ascertain a condition factor of at least one component of the at least one item of inductive equipment as a maximum value of one of the real-time data associated with the at least one component, the at least one component comprising insulating oil, windings, bushings, tap changer, or cooling system;
   ascertain a failure rate for the at least one item of inductive equipment on the basis of the condition factor by calculating a distribution function using the condition factor; and
   determine a maximum permitted hotspot temperature on the basis of the failure rate of the at least one item of inductive equipment based a failure rate index determined from the failure rate and a total operating time of the item of inductive equipment; at least one reliability database connected to each monitoring unit of the at least one item of inductive equipment and configured to: record statistical data relating to the at least one item of inductive equipment; ascertain a statistical failure rate based on statistical data relating to the at least one item of inductive equipment; and transmit the statistical failure rate to the monitoring unit; and
   a server in communication with the monitoring unit, the server being configured to receive the maximum permitted hotspot temperature of the at least one item of inductive equipment and to manage the power supply grid based on the maximum permitted hotspot temperature.

10. The system as claimed in claim 9, wherein the evaluator is configured to ascertain the overload capacity of the item of inductive equipment on the basis of the maximum permitted hotspot temperature.

11. The system as claimed in claim 9, the system comprising:
   a communication unit communicatively connected to the monitoring unit of each of the at least one item of equipment and to a display unit, wherein the display unit is configured to indicate the ascertained overload capacity of the at least one item of inductive equipment, and the communication unit is configured to transmit the overload capacity ascertained by the monitoring unit to the display unit.

12. The system as claimed in claim 9, the system comprising at least one condition assessment system connected to each monitoring unit of the at least one item of inductive equipment and is configured to:
   record historical data relating to the at least one item of inductive equipment;
   ascertain a historical failure rate based on the historical data relating to the at least one item of inductive equipment; and
   transmit the historical failure rate to the monitoring unit.

13. The system as claimed in claim 9, wherein the monitoring unit is configured to:
   obtain forecast data relating to a future condition of the at least one item of inductive equipment;
   ascertain a forecast overload capacity based on the forecast data; and
   assess the ascertained overload capacity on the basis of a deviation from the forecast overload capacity.

14. The system as claimed in claim 9, wherein a plurality of items of inductive equipment are connected in a power supply grid, and a respective monitoring unit is assigned to each item of inductive equipment of the power supply grid.

15. The system as claimed in claim 9, wherein the at least one item of inductive equipment comprises a transformer or an inductor, which comprises a plurality of components comprising the at least one component,
- wherein obtaining the real-time data relating to the current condition of the at least one item of inductive equipment from the data memory over the period of time, comprises obtaining real-time data relating to the components of the transformer or the inductor,
- wherein the monitoring unit is further configured to ascertain a plurality of condition factors of the plurality of components, comprising the condition factor of the at least one component,
- wherein ascertain the failure rate for the at least one item of inductive equipment comprises:
  - calculating an online failure rate for each of the components by calculating a plurality of distribution functions using the condition factors, which comprises calculating the distribution function using the condition factor;
  - calculating an online failure rate for the transformer or the inductor by summing the online failure rate for each of the components;
  - calculating an overall failure rate based on a weighted sum of the online failure rate for the transformer or the inductor, a statistical failure rate, and a historical failure rate, and
  - calculating the failure rate index according to: $FRI = 1 - e^{-FR*t}$, where FRI is the failure rate index, FR is the overall failure rate, and t is the total operation time of the transformer or inductor in years, and wherein determining the maximum permitted hotspot temperature is done on the basis of the following equation: $T_{HST_{FRI}} = T_{HST_{max}} - (T_{HST_{max}} - T_{HST_{min}})$rein $T_{HST_{FRI}}$ is the determined maximum permitted hotspot temperature, $T_{HST_{max}}$ a prescribed maximum temperature according to predetermined standards of overload on transformers or inductors, and $T_{HST_{min}}$ a predetermined by the operator.

* * * * *